(12) United States Patent
Meijer

(10) Patent No.: US 7,435,047 B2
(45) Date of Patent: Oct. 14, 2008

(54) FORK-LIFT LOADING SYSTEM WITH ROLLER DRIVEN LOADING AND SUPPORT SURFACE

(75) Inventor: Sjoerd Meijer, Sint Jacobiparochie (NL)

(73) Assignee: Gebr. Meijer St. Jabik B.V., Jacobiparochie (NL)

( * ) Notice: Subject to any disclaimer, the term of this patent is extended or adjusted under 35 U.S.C. 154(b) by 0 days.

(21) Appl. No.: 10/479,812

(22) PCT Filed: Jun. 7, 2002

(86) PCT No.: PCT/NL02/00370

§ 371 (c)(1),
(2), (4) Date: Apr. 22, 2004

(87) PCT Pub. No.: WO02/100760

PCT Pub. Date: Dec. 19, 2002

(65) Prior Publication Data

US 2004/0191047 A1    Sep. 30, 2004

(30) Foreign Application Priority Data

Jun. 11, 2001 (NL) .................................. 1018259
Aug. 22, 2001 (NL) .................................. 1018793

(51) Int. Cl.
*B66C 3/00* (2006.01)
*B65F 9/00* (2006.01)
*B60P 1/00* (2006.01)
*B65G 13/00* (2006.01)

(52) U.S. Cl. ...................... 414/785; 414/353; 414/439; 414/532; 193/35 R

(58) Field of Classification Search ................. 414/785, 414/343, 495, 540, 607, 439, 437, 659, 661; 108/57.15; 198/832, 833, 781.04, 781.08; 280/5.24; 193/35 R, 35 B, 35 SS
See application file for complete search history.

(56) References Cited

U.S. PATENT DOCUMENTS

| 1,425,727 | A | * | 8/1922 | Wallstrom | 414/437 |
| 1,708,854 | A | * | 4/1929 | Stahlhut | 414/353 |
| 2,468,055 | A | * | 4/1949 | Gibler | 414/528 |
| 2,570,726 | A | | 10/1951 | Smith | |
| 2,812,080 | A | * | 11/1957 | Campos | 414/531 |
| 4,355,940 | A | * | 10/1982 | Derickson | 414/439 |
| 5,082,415 | A | * | 1/1992 | Hayashi | 414/343 |
| 6,264,417 | B1 | * | 7/2001 | Salsburg | 414/610 |

FOREIGN PATENT DOCUMENTS

| DE | 4321314 | A1 | * | 1/1995 |
| JP | 6-115891 | A1 | | 4/1994 |
| NL | 1014147 | C2 | * | 7/2001 |

* cited by examiner

*Primary Examiner*—Saul J. Rodriguez
*Assistant Examiner*—Gregory W Adams
(74) *Attorney, Agent, or Firm*—The Webb Law Firm

(57) ABSTRACT

The invention relates to a loading platform (2,3) for displacing goods, comprising a support frame for goods (8) and at least one double roller device (7,9) arranged in longitudinal direction, wherein the double roller device comprises a number of first roller elements (9) situated at regular mutual distances and having a rolling surface (15), and a number of second roller elements (7) situated above the first roller elements and having a rolling surface (15), and wherein the rolling surface of the first roller elements lies against the rolling surface of the second roller elements, characterised in that the roller elements engage movably on the frame in vertical direction.

12 Claims, 5 Drawing Sheets

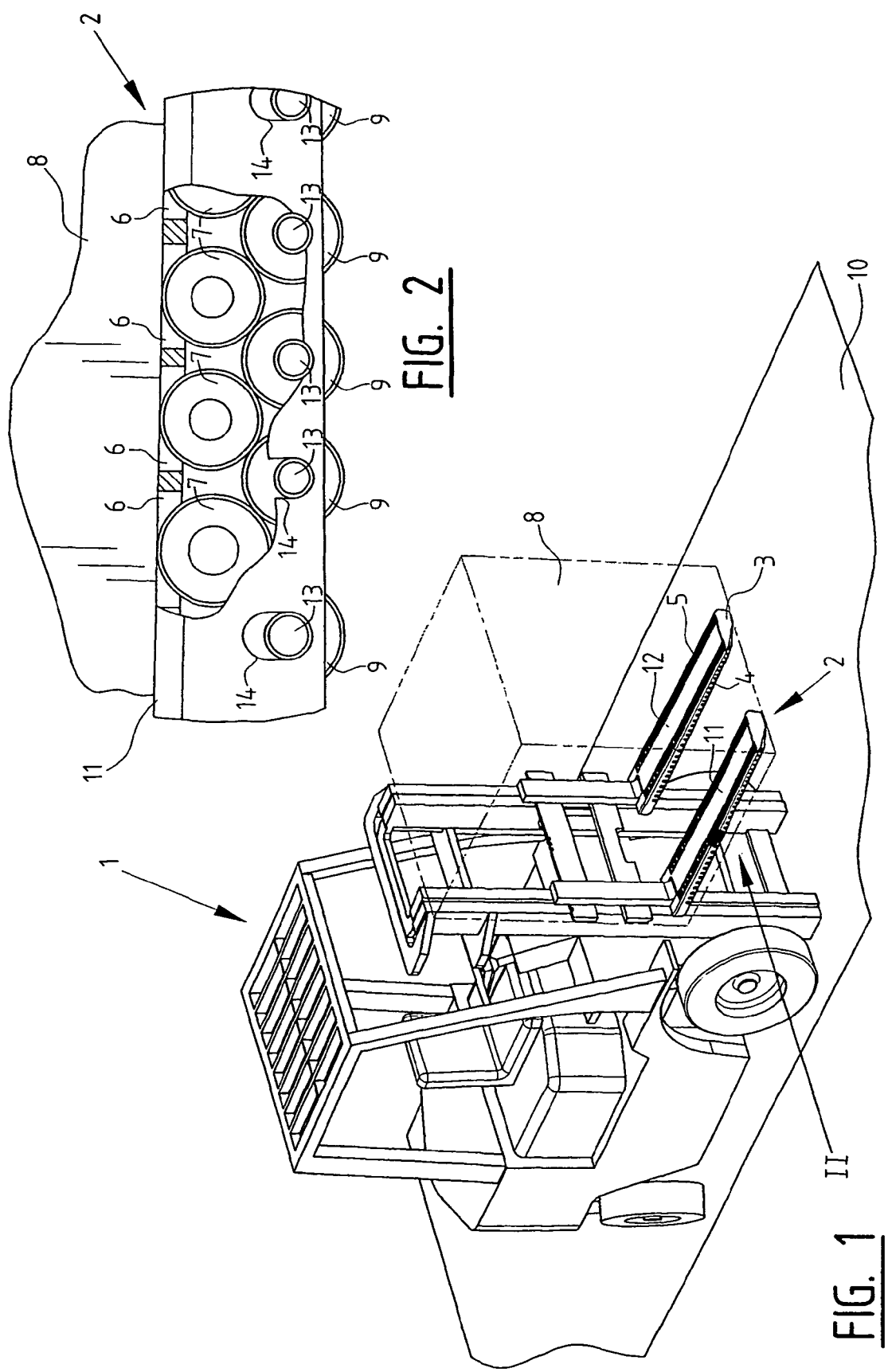

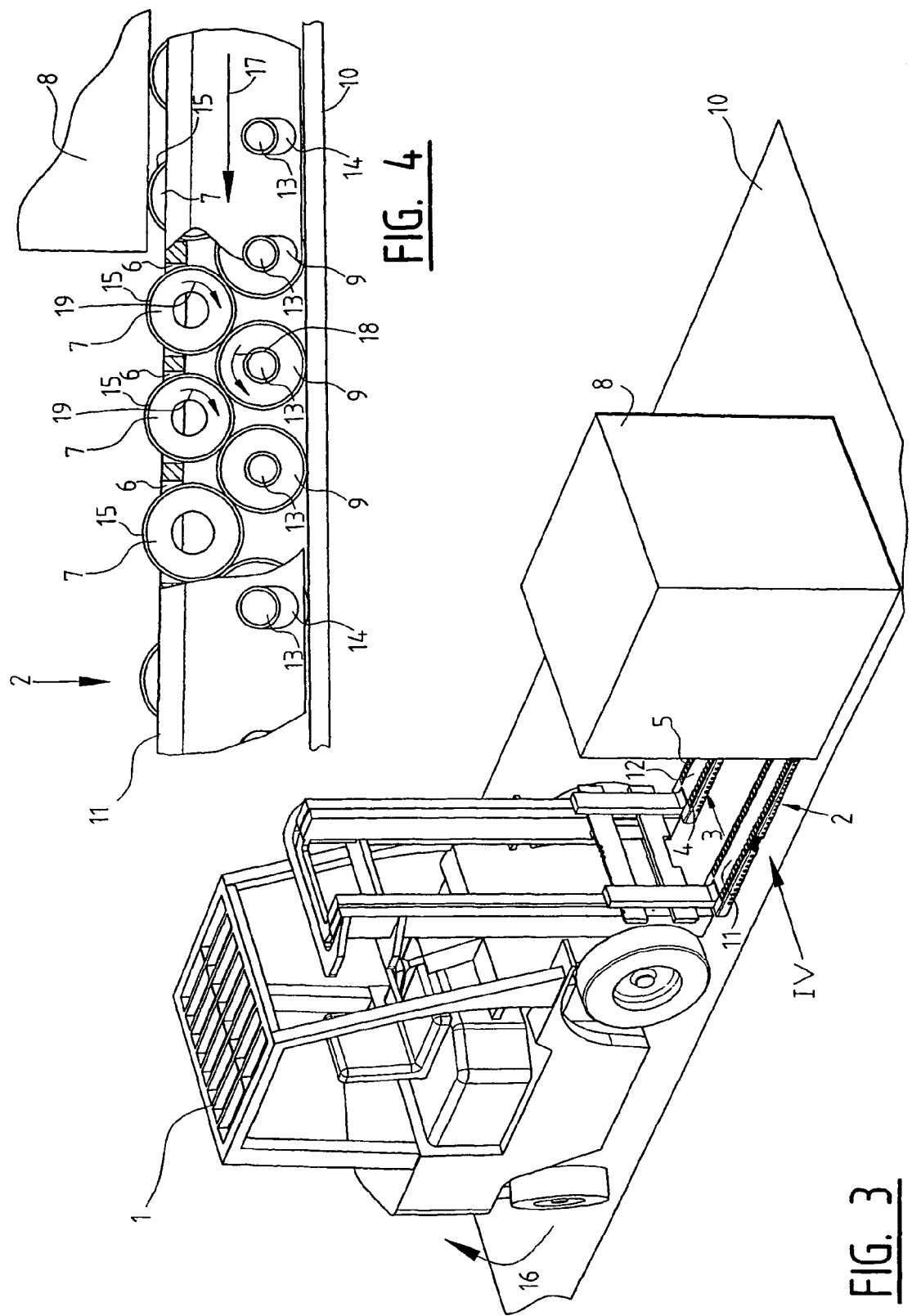

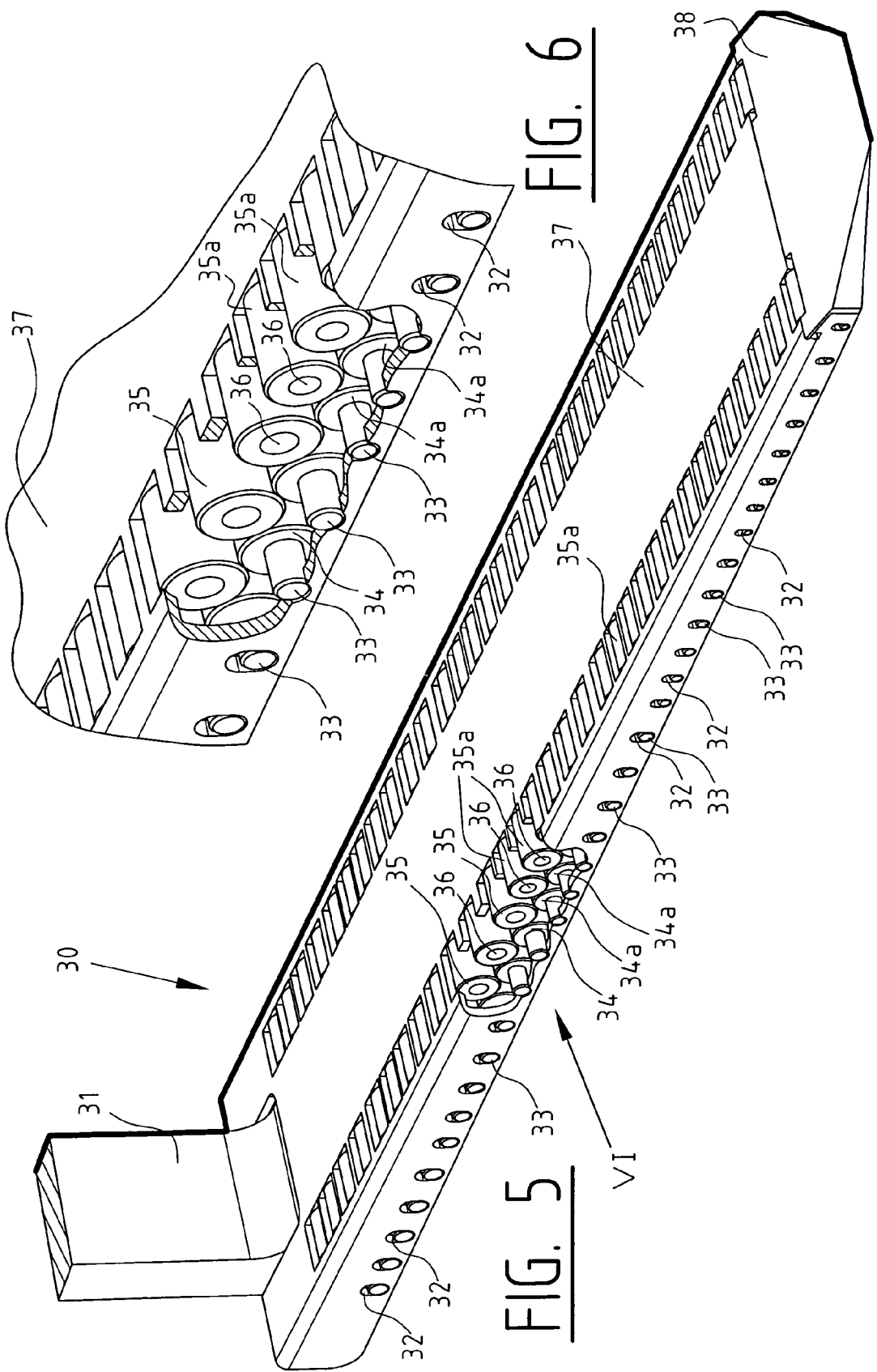

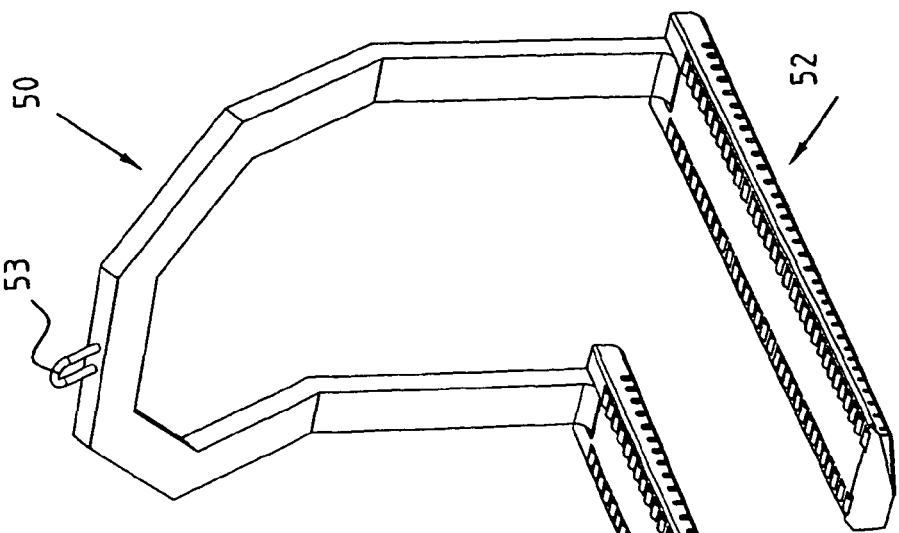
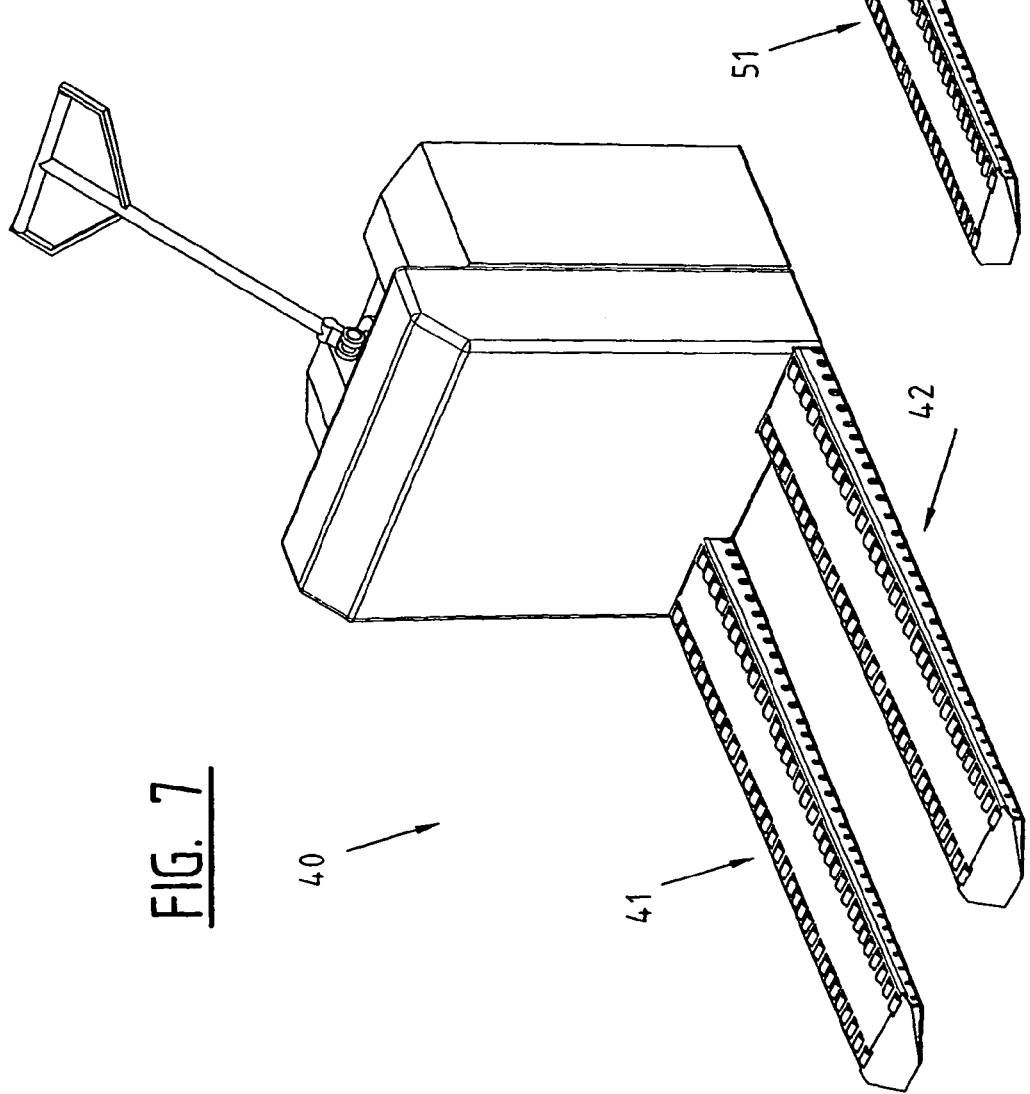

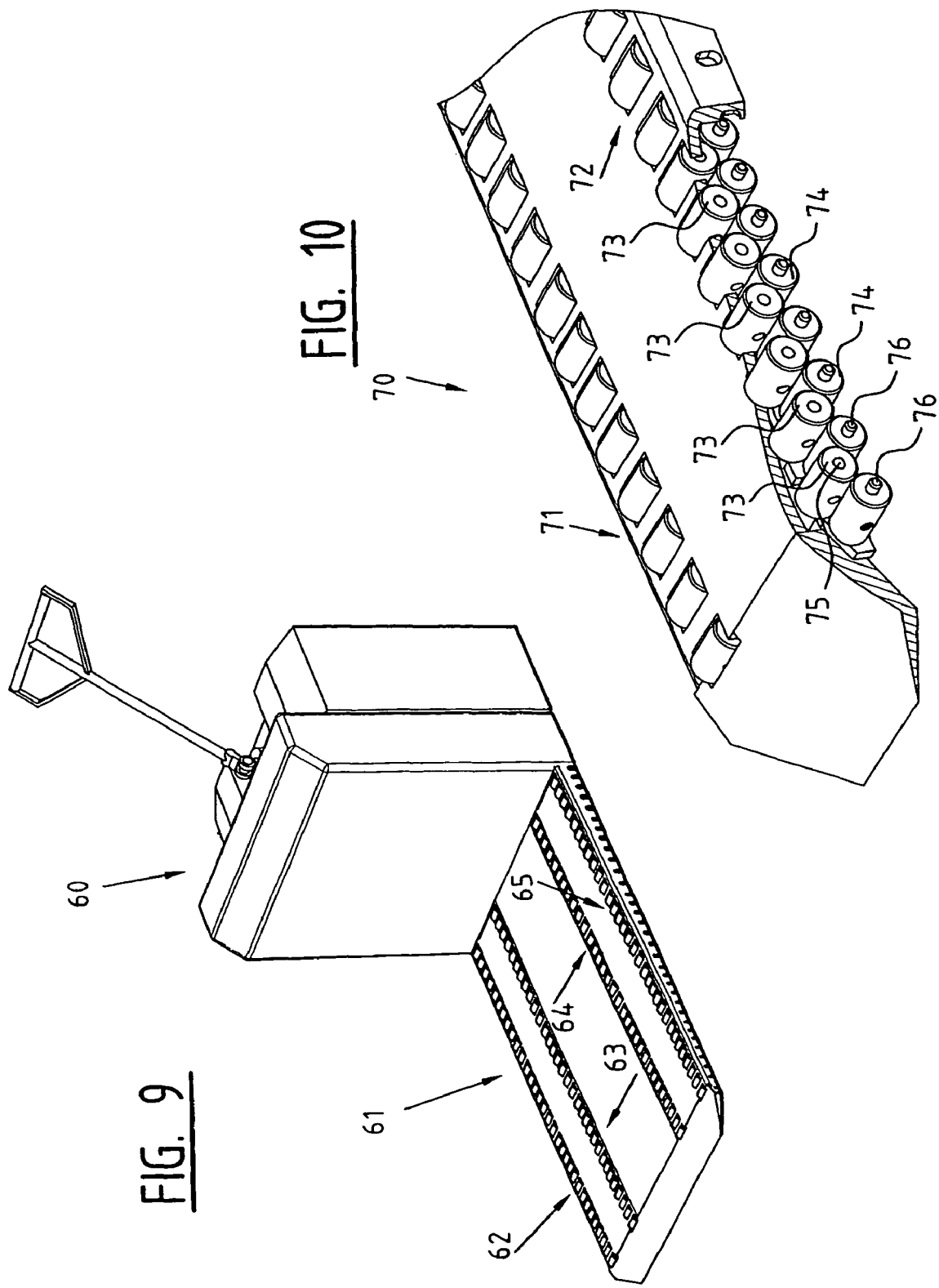

FORK-LIFT LOADING SYSTEM WITH ROLLER DRIVEN LOADING AND SUPPORT SURFACE

The present invention relates to a loading platform for displacing goods, comprising a support frame for goods and at least one double roller device arranged in longitudinal direction, wherein the double roller device comprises a number of first roller elements situated at regular mutual distances and having a rolling surface, and a number of second roller elements situated above the first roller elements and having a rolling surface, and wherein the rolling surface of the first roller elements lies against the rolling surface of the second roller elements.

Such a device is known from U.S. Pat. No. 4,355,940. For transport of goods such a loading platform can be arranged under goods. Such a loading platform is however suitable for transport over short distances.

The invention has for its object to provide a device for efficiently displacing goods over a greater distance.

This object is achieved with the invention by providing a loading platform as according to claim 1. The second roller element will hereby have at least two positions, a first position, when goods are carried during transport, wherein the second roller elements have no contact with the goods but are guided to a lower position in the frame. The goods engage on the support frame and will not begin to shift during transport. In the second position the first roller elements engage on the support surface on which the goods are placed and the second roller elements can engage on the goods.

Coupling means are preferably present. These are adapted such that the loading platform can be coupled to a lifting device. The coupling means can be assembled in diverse ways. The coupling means in any case reduce the chance of the loading platform shifting relative to the lifting device to which the platform is coupled.

The support frame of the loading platform is adapted to carry goods, such as for instance a container or boxes. The loading platform is adapted to be pushed beneath a load and removed in efficient manner.

The invention also relates to and provides a lifting device equipped with a loading platform of the present type.

The lifting device, such as a (fork-)lift truck, a crane or other lifting devices which carry goods during transport, and the loading platform engaging thereon move toward the load for displacing. The loading platform is held for this purpose in the desired position in front of the lifting device at the height of a supporting surface. This can be a loading floor or a ground surface.

The loading platform according to the invention comprises a first set of roller elements with a rolling surface. In this position the roller elements make friction contact with the supporting surface and execute a rolling movement.

The loading platform according to the invention comprises a second set of roller elements with a rolling surface which are arranged above the first set, wherein the rolling surface of the first set of roller elements lies against the rolling surface of the second set of roller elements. When in fact the loading platform rolls over the supporting surface with the first roller elements, the rolling surfaces of both roller elements make contact such that the second roller elements also roll. In the case of a loading platform moving to the right, the first roller elements roll clockwise. Conversely, the second roller elements roll counter-clockwise.

The second roller elements protrude partly out of the interior of the loading platform through recesses in the upper surface of the loading platform. The protruding rolling surfaces of the second roller elements carry the load arranged on the upper side of the loading platform. The rolling movement of the second roller elements ensures that the load is stationary relative to the supporting surface, while the loading platform is moved under the load. The load is thus shovelled onto the loading platform.

The loading platform preferably tapers to a point at the front end. The loading platform, is pushed with the point under a load situated on the supporting surface. The loading platform shovels the load so that the loading platform is arranged between load and surface. The whole of the loading platform is arranged under the load by the forward moving lifting device.

The lifting device is operated in usual manner to lift the loading platform from the floor surface. The load is now displaced to the position where it must be placed. The loading platform supports the load. The upper surface of the loading platform is of a high-friction material so that the load will not shift during displacement of the load.

The loading platform is lowered in usual manner by the lifting device. The loading platform is situated once again in a position in front of the lifting device, wherein the first roller elements make contact with a supporting surface and take up a higher position relative to the loading platform through the agency of free vertical mounting. The rolling surface of the second roller elements supports the load.

When the lifting device is travelling backward, the loading platform will move from under the load. The roller elements co-act such that the load is shifted off the loading platform such that the load does not move relative to the ground surface.

The thickness of the stacked roller elements is in any case greater than the thickness of the loading platform, since the roller elements could otherwise not protrude simultaneously at both the top and bottom of the loading platform.

The roller elements can be assembled with the same diameter. The diameter of a roller element from the first set is substantially equal to the diameter of a roller element from the second set with which the rolling surface of the first roller element is in contact. This measure ensures that the relative speed of the load relative to the ground surface is zero.

In a preferred embodiment the thickness of the loading platform increases from the front to the rear. The diameter of the roller elements then increases in proportionally equal manner from the front to the rear.

According to the invention the roller elements can comprise all roller elements suitable for this application which have a rolling surface, such as for instance round balls. Preferably however, the first and second roller elements comprise rollers. The cylindrical rollers are preferably locked on a shaft.

In a preferred embodiment the loading platform comprises a nose at the front end. The nose forms a small part of the loading platform. The nose forms the pointed front end of the loading platform. The nose is made up of a strong material with a smooth surface, for instance Teflon, which is a registered trademark. The nose is manufactured such that is can be arranged under a load as the first component of the loading platform. The nose is connected to the loading platform. The nose can be replaced in the case of wear. The nose can also be replaced by a nose which is specifically embodied for efficient co-action with the load for displacing.

The shafts of the roller elements of the respective sets of roller elements can lie in one vertical plane. Preferably however, the shafts lie obliquely one above another. The diameters of the respective roller elements hereby do not lie mutually in line, whereby the loading platform becomes less thick.

A loading platform preferably comprises more than one double roller device. These are placed adjacently of each other. In this manner it is possible to embody a large surface area with double roller device.

The loading platform replaces the normal fork of a usual fork-lift truck, or forms an attachment for a usual fork. The loading platform can be placed over the usual fork and be coupled thereto.

It is favorable to arrange the double roller device in a reverse U-shaped profile with a base and legs, wherein the rollers are mounted on the legs. The roller elements are mounted on the profile for movement in vertical direction along the legs. Recesses are arranged in the base so that the second roller elements can protrude therethrough when they are arranged on the inside of the U-profile.

In the embodiment as fork for a fork-lift truck, the fork preferably comprises two U-shaped profiles, each comprising two double roller devices.

The invention is further elucidated with reference to the following figures.

FIG. 1 shows a perspective view of a fork-lift truck with an embodiment of the loading platform as fork according to the invention.

FIG. 2 shows a partly cut-away detail view of the loading platform according to FIG. 1.

FIG. 3 shows a perspective view of a fork-lift truck with an embodiment of the loading platform as fork according to the invention.

FIG. 4 shows a partly cut-away detail view of the loading platform according to FIG. 3.

FIG. 5 shows a partly cut-away view of the loading platform as attachment for a fork according to the invention.

FIG. 6 shows a detail of FIG. 5.

FIG. 7 shows a hand pallet truck with a loading platform.

FIG. 8 shows a universal crane hook with two loading platforms according to the invention.

FIG. 9 shows an attachment according to the invention with four double roller devices.

FIG. 10 shows a partly cut-away loading platform with two double roller devices according to a second embodiment.

FIG. 1 shows a usual fork-lift truck 1 equipped with two loading platforms 2,3 according to the invention. Loading platforms 2,3 are embodied as fork. A fork 3 has two rows of roller elements 4,5 running along the length of the loading platform. Loading platform 2,3 has an upper surface with recesses 6. The recesses 6 are formed at a position where a corresponding roller element 7 of the second roller elements is situated in the loading platform.

Forks 2,3 are held above the ground by fork-lift truck 1. Forks 2,3 carry a load 8 (indicated with dotted lines). The first roller elements 9 of the fork do not make contact with supporting surface 10, the ground, or with load 8. The load is carried by the upper surface 11,12 of fork 2,3. Fork-lift truck 1 can move freely. This takes place in the usual manner.

FIG. 2 shows a detail as according to II in FIG. 1. It shows the situation of fork 2, when fork 2 is held in the air. The first roller elements 9 hang from their shafts 13 in the longitudinal slots 14 of fork 2. The second roller elements 7 are supported by the roller elements 9 situated thereunder. The second roller elements 7 are arranged at a higher position, but between the first roller elements 9 situated at regular distances.

In FIG. 3 the load 8 is placed on ground surface 10. The loading platforms in the form of forks 2,3 are moved downward relative to the position in FIG. 1. Forks 2,3 are situated in the lowest position. The undersides of forks 2,3 make contact with ground surface 10. Roller elements 7,9 are hereby moved upward relative to fork 2,3, whereby the rolling surface 15 of the second roller elements 7 protrude through recesses 6 in the upper surface 11 of fork 2. These roller elements 7 carry load 8.

Fork-lift truck 1 moves rearward as according to arrow 16. Fork 3 slides out from under load 8. Roller elements 7,9 ensure that the load is held in the same position relative to ground surface 10 and thus rolled off the forks 2,3.

FIG. 4 shows a detail according to IV in FIG. 3. Fork 2 shows the roller elements which are situated in a higher position vertically relative to FIG. 2. The first roller elements 9 make contact with ground surface 10. Shafts 13 are situated higher in longitudinal slots 14. The rolling surface 15 of second roller elements 7 protrudes through recesses 6 of upper surface 11 of fork 2 and engage on load 8.

During a movement of fork 2 as according to arrow 17 when fork-lift truck 1 moves as according to arrow 16, the first roller elements 9 will move counter-clockwise as according to arrow 18. Owing to the contact between the rolling surfaces of roller elements 7,9 the second roller elements move as according to arrow 19. Load 8 will remain stationary relative to ground surface 10.

The illustration also shows the moment at which a load 8 is engaged, before it is displaced. In similar manner, but in opposing directions, forks 2,3 are pushed under load 8 and load 8 is shovelled.

FIG. 5 shows a loading platform 30 according to a second embodiment. The loading platform is placed as an attachment over fork 31 of a lifting device. Attachment 30 does not comprises any separate coupling means to fork 31, but is fixed on the fork by friction caused by its own weight. Fork 31 of for instance a fork-lift truck extends beneath the middle pert of loading platform 30. The two double roller devices are located on both sides of the fork 31. Loading platform 30 sloping toward point 38 and having vertical longitudinal slots 32 can be seen.

The shaft 33 of the cylindrical rollers of first roller elements 34 is mounted in longitudinal slots 32. Rollers 34 are locked onto shaft 33. As shown, the shaft 33 and roller element 34 hang in the bottom of longitudinal slot 32 of the frame under the influence of gravity. This corresponds with the situation shown in FIG. 1. When the fork is placed on a ground surface, attachment 30 will be carried by rollers 34 and their shafts 33 through the effect of gravity, wherein shafts 33 are situated at the upper end of longitudinal slot 32.

Also shown are second roller elements 35. These are situated above first roller elements 34. The shaft 36 of each cylindrical roll of a second roller element 35 is situated, seen vertically, between first roller elements 34 and the upper surface 37 of attachment 30 and, seen horizontally, also in each case between first roller elements 34.

A nose 38 is arranged on the front end of attachment 30. Nose 38 tapers to a point, so that it can be pushed efficiently under a load. Nose 38 can be replaced and can also be adapted specifically to the load to be carried.

The double roller devices are arranged around a middle part. This part is placed over a usual fork 31 of a fork-lift truck. The fork according to the invention thus lies over the still present fork of the fork-lift truck. In this manner no special requirements necessary for assembly of the fork.

The fork is less thick at its front end. The thickness increases toward the rear. The same applies for the diameter of the respective roller elements. FIG. 5 (and FIG. 6) show first and second roller elements 34a and 35a, respectively, which are smaller m diameter than first and second roller elements 34 and 35. Roller elements 34a and 35a are located forward of roller elements 34 and 35 toward the front end of the fork. The increasing thickness corresponds with the increasing moment of inertia which the fork has to support when it lifts a load.

FIG. 6 shows a detail of FIG. 5 as according to arrow VI. Shown is the situation of the attachment of the fork when the fork is in the air. The cylindrical rollers of the first set of roller elements hang on shafts 33 in longitudinal slots 32 of attachment 30. Shaft 33 is situated in the bottom part of longitudinal slot 32. It can also be seen that second roller elements 35 do not protrude through the recesses in upper surface 37.

FIG. 7 shows a hand pallet truck 40 with two loading platforms 41,42. The loading platforms are attachments on the fork of hand pallet truck 40 and function in accordance with the description given in respect of the fork-lift truck.

FIG. 8 shows a universal crane hook 50 with two loading platforms 51,52. Crane hook 50 can be connected with hook 53 to the tackle of a crane (not shown).

FIG. 9 shows an attachment according to the invention with four double roller devices. An attachment 61 is placed according to the invention over the forks (not shown) of a hand pallet truck 60. This loading platform 61 comprises four double roller devices 62-65. This loading platform can be arranged as a whole under a load (not shown).

FIG. 10 shows a partly cut-away loading platform 70 with two double roller devices 71,72 according to a second embodiment. Rollers 73 of the second roller elements are placed straight above rollers 74 of the first roller elements. Shafts 75 of the second roller elements lie substantially in one vertical plane with the shafts 76 of the first roller elements. This is favorable in respect of load distribution but requires a greater thickness of the profile and the fork.

The invention claimed is:

1. A load transportation device for transporting a load above a ground surface, comprising:

at least one fork in the form of a support frame configured to be raised and lowered and including a first edge, a second edge, and an upper surface and a lower surface, each extending substantially between the first edge and the second edge and defining a support frame length, wherein the upper surface includes at least one slot extending therethrough, the second edge forming a nose that tapers to a point for engagement with and under the load, such that it can be effectively pushed under the load to be carried;

at least one contiguous first row of vertically displaceable roller elements having a rolling surface extendable and retractable through the at least one slot and the upper surface of the support frame in and out of contact with at least a portion of the load;

at least one contiguous second row of vertically displaceable roller elements having a rolling surface configured to contact the rolling surface of at least one roller element of the first row of roller elements;

wherein a diameter of the roller elements of at least one of the first row and second row of roller elements decreases along the length of the support frame in a direction towards the nose at the second edge of the support frame;

wherein at least one of the at least one first row of roller elements and at least one second row of roller elements extends substantially the length of the support frame, such that during loading or unloading of the loads, the load is held in the same position relative to the ground surface;

wherein the support frame includes a plurality of slots extending through a side surface thereof, each of the roller elements of the second row of roller elements rotatably attached to the support frame via a shaft extending through a respective slot, wherein each shaft is vertically displaceable in the slot, thereby allowing the first and second row of roller elements to move vertically; and wherein said first row defines a loading surface in contact with said load.

2. The device of claim 1, wherein the vertical height of the support frame decreases along the length thereof in a direction towards the tapered point of the second edge of the support frame.

3. The device of claim 1, further comprising at least two support frames in the form of a fork extending from the load transportation device.

4. The device of claim 1, wherein the load transportation device is at least one of a forklift truck, a hand pallet truck and a crane hook.

5. A loading platform for use in connection with at least one existing fork of an existing load transportation device, the loading platform comprising:

a support frame having a first edge, a second edge, and an inner area, an upper surface and a lower surface, each extending substantially between the first edge and the second edge and defining a support frame length, wherein the upper surface includes at least one slot extending therethrough;

at least one contiguous first row of vertically displaceable roller elements having a rolling surface configured to extend through the at least one slot and above the upper surface of the support frame;

at least one contiguous second row of vertically displaceable roller elements having a rolling surface configured to contact the rolling surface of at least one roller element of the first row of roller elements;

wherein the support frame is removably attachable over the at least one existing fork of the existing load transportation device by inserting the at least one fork through an opening located at the first edge of the support frame and at least partially into the inner area of the support frame;

wherein a diameter of the roller elements of at least one of the first row and second row of roller elements decreases along the length of the support frame in a direction towards the second edge of the support frame; and wherein said first row defines a loading surface in contact with said load.

6. The loading platform of claim 5, wherein the support frame is mechanically coupled to the fork.

7. The loading platform of claim 5, wherein the support frame further comprises a nose arranged on the second edge thereof, wherein the nose tapers to a point, such that it can be effectively pushed under a load to be carried.

8. The loading platform of claim 5, wherein the support frame is attachable over a plurality of forks of the load transportation device.

9. The loading platform of claim 5, wherein at least one of the at least one first row of roller elements and at least one second row of roller elements extends substantially the length of the support frame, such that during loading or unloading of a load, the load is held in the same position relative to a ground surface.

10. The loading platform of claim 5, wherein the vertical height of the support frame decreases along the length thereof in a direction towards the second edge of the support frame.

11. The loading platform of claim 5, wherein the support frame includes a plurality of slots extending through a side surface thereof, each of the roller elements of the second row of roller elements rotatably attached to the support frame via a shaft extending through a respective slot, wherein each shaft is vertically displaceable in the slot, thereby allowing the first and second row of roller elements to move vertically.

12. The loading platform of claim 5, wherein the load transportation device is at least one of a forklift truck, a hand pallet truck and a crane hook.

* * * * *